US009223436B2

(12) United States Patent
Land et al.

(10) Patent No.: US 9,223,436 B2
(45) Date of Patent: *Dec. 29, 2015

(54) FULL SCALE CALIBRATION MEASUREMENT FOR MULTI-TOUCH SURFACES

(75) Inventors: Brian Richards Land, Redwood City, CA (US); Steve Porter Hotelling, Los Gatos, CA (US); Richard Wei Kwang Lim, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 13/405,218

(22) Filed: Feb. 24, 2012

(65) Prior Publication Data

US 2012/0154339 A1 Jun. 21, 2012

Related U.S. Application Data

(63) Continuation of application No. 11/650,039, filed on Jan. 3, 2007, now Pat. No. 8,125,455.

(51) Int. Cl.
*G09G 5/00* (2006.01)
*G06F 3/041* (2006.01)

(52) U.S. Cl.
CPC .................................. *G06F 3/0418* (2013.01)

(58) Field of Classification Search
CPC .............................. G06F 3/0416; G06F 3/044
USPC ...................... 345/173–178; 178/18.01–18.06
See application file for complete search history.

(56) References Cited

U.S. PATENT DOCUMENTS

| 4,914,624 A | 4/1990 | Dunthorn |
| 5,283,559 A | 2/1994 | Kalendra et al. |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |

(Continued)

FOREIGN PATENT DOCUMENTS

| JP | 2000-163031 A | 6/2000 |
| JP | 2002-342033 A | 11/2002 |

OTHER PUBLICATIONS

Final Office Action mailed Jun. 9, 2011, for U.S. Appl. No. 11/650,039, filed Jan. 3, 2007, eight pages.

(Continued)

*Primary Examiner* — Jennifer Nguyen
(74) *Attorney, Agent, or Firm* — Morrison & Foerster LLP

(57) ABSTRACT

Normalization of regions of a sensor panel capable of detecting multi-touch events, or a sensor panel capable of detecting multi-hover events, is disclosed to enable each sensor in the sensor panel to trigger a virtual button in a similar manner, given the same amount of touch or hover. Each sensor produces an output value proportional to the level or amount of touch or hover. However, due to processing, manufacturing and physical design differences, the sensor output values can vary from region to region or panel to panel for a given amount of touch or hover. To normalize the sensor output values across regions, gain and offset information can be obtained in advance, stored in nonvolatile memory, and later used to normalize the sensor output values so that all regions in the sensor panel can trigger virtual buttons similarly, providing a uniform "response function" at any location on the sensor panel.

19 Claims, 8 Drawing Sheets

(56) References Cited

U.S. PATENT DOCUMENTS

| | | | |
|---|---|---|---|
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,456,952 | B1 | 9/2002 | Nathan |
| 6,690,387 | B2 | 2/2004 | Zimmerman et al. |
| 6,933,931 | B2 | 8/2005 | Lubarsky, Jr. et al. |
| 7,015,894 | B2 | 3/2006 | Morohoshi |
| 7,176,897 | B2 | 2/2007 | Roberts |
| 7,184,064 | B2 | 2/2007 | Zimmerman et al. |
| 7,307,623 | B2 | 12/2007 | Enomoto |
| 7,337,085 | B2 | 2/2008 | Soss |
| 7,663,607 | B2 | 2/2010 | Hotelling et al. |
| 7,737,957 | B2 * | 6/2010 | Lee et al. ............... 345/173 |
| 8,125,455 | B2 | 2/2012 | Land et al. |
| 8,125,464 | B2 | 2/2012 | Land et al. |
| 8,479,122 | B2 | 7/2013 | Hotelling et al. |
| 2003/0132922 | A1 | 7/2003 | Philipp |
| 2006/0026521 | A1 | 2/2006 | Hotelling et al. |
| 2006/0097991 | A1 | 5/2006 | Hotelling et al. |
| 2006/0197753 | A1 | 9/2006 | Hotelling |
| 2007/0070049 | A1 * | 3/2007 | Lee et al. ............... 345/173 |
| 2007/0070050 | A1 * | 3/2007 | Westerman et al. ..... 345/173 |
| 2007/0091078 | A1 * | 4/2007 | Park et al. ............... 345/173 |
| 2007/0235231 | A1 * | 10/2007 | Loomis et al. ........ 178/18.06 |
| 2008/0012835 | A1 | 1/2008 | Rimon et al. |
| 2008/0158172 | A1 | 7/2008 | Hotelling et al. |
| 2008/0158176 | A1 | 7/2008 | Land et al. |
| 2011/0037735 | A1 | 2/2011 | Land et al. |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed Dec. 27, 2010, for U.S. Appl. No. 11/650,039, filed Jan. 3, 2007, seven pages.

Notice of Allowance mailed Nov. 21, 2011, for U.S. Appl. No. 11/650,039, filed Jan. 3, 2007, seven pages.

Notice of Allowance mailed Nov. 23, 2011, for U.S. Appl. No. 12/905,878, filed Oct. 15, 2010, five pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

FULL SCALE CALIBRATION MEASUREMENT FOR MULTI-TOUCH SURFACES

CROSS-REFERENCE TO RELATED APPLICATIONS

This application is a continuation of U.S. patent application Ser. No. 11/650,039, filed Jan. 3, 2007, the entire disclosure of which is incorporated herein by reference in its entirety for all purposes.

FIELD OF THE INVENTION

This relates to panels used as input devices for computing systems, and more particularly, to the pre-storing of region-based normalization information in nonvolatile memory for use during boot-up so that all sensors in all regions in the sensor panel can trigger virtual buttons similarly, providing a uniform "response function" at any location on the sensor panel.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of or integral with a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch panels can include an array of touch sensors capable of detecting touch events (the touching of fingers or other objects upon a touch-sensitive surface). Future touch panels may be able to detect multiple touches (the touching of fingers or other objects upon a touch-sensitive surface at distinct locations at about the same time) and near touches (fingers or other objects within the near-field detection capabilities of their touch sensors), and identify and track their locations. Examples of multi-touch panels are described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

Proximity sensor panels are another type of input device that can include an array of proximity sensors capable of detecting hover events (the no-touch, close proximity hovering of fingers or other objects above a surface but outside the near-field detection capabilities of touch sensors) as well as touch events. Proximity sensor panels may also be able to detect multiple instances of hovering referred to herein as multi-hover events (the hovering of fingers or other objects above a surface at distinct locations at about the same time). Examples of a proximity sensor, a proximity sensor panel, a multi-hover panel and a computing system using both an multi-touch panel and proximity sensors are described in Applicant's co-pending U.S. application Ser. No. 11/649,998 entitled "Proximity and Multi-Touch Sensor Detection and Demodulation," filed on Jan. 3, 2007, the contents of which are incorporated by reference herein.

Proximity sensor panels can be employed either alone or in combination with multi-touch panels. In addition, it is noted that some touch sensors, particularly capacitive touch sensors, can detect some hovering or proximity. Proximity sensors, as referred to herein, are understood to be distinct from touch sensors, including touch sensors that have some ability to detect proximity. Multi-touch sensor panels capable of detecting multi-touch events and multi-hover sensor panels capable of detecting multi-hover events may collectively be referred to herein as multi-event sensor panels.

Both touch sensor panels and proximity sensor panels can be formed as an array of rows and columns of sensors. To scan a sensor panel, a stimulus can be applied to one row with all other rows held at DC voltage levels. When a row is stimulated, a modulated output signal can appear on the columns of the sensor panel. The columns can be connected to analog channels (also referred to herein as event detection and demodulation circuits). For every row that is stimulated, each analog channel connected to a column generates an output value representative of an amount of change in the modulated output signal due to a touch or hover event occurring at the sensor located at the intersection of the stimulated row and the connected column. After analog channel output values are obtained for every column in the sensor panel, a new row is stimulated (with all other rows once again held at DC voltage levels), and additional analog channel output values are obtained. When all rows have been stimulated and analog channel output values have been obtained, the sensor panel is said to have been "scanned," and a complete "image" of touch or hover can be obtained over the entire sensor panel. This image of touch or hover can include an analog channel output value for every pixel (row and column) in the panel, each output value representative of the amount of touch or hover that was detected at that particular location.

Thus, for example, if a finger touched down directly in the center of a touch panel, the resultant image of touch would include analog channel output values for the pixels located near the center of the panel indicative of touch events occurring at those pixels. The pixels with these output values might be generally grouped together in a oval, fingerprint-shaped cluster. Furthermore, the pixels in the center of that oval can have output values indicative of a greater of degree of touch than those pixels at the outside edges of the oval. A similar image of hover can be captured for a finger hovering over the center of the panel.

As mentioned above, a display screen can be located beneath the sensor panel. A user interface (UI) algorithm can generate a virtual keypad or other virtual input interface beneath the sensor panel that can include virtual buttons, pull-down menus and the like. By detecting touch or hover events at locations defined by the virtual buttons, the UI algorithm can determine that a virtual button has been "pushed." The magnitude of the analog channel output values, indicating the "degree" of touch or hover, can be used by the UI algorithm to determine whether there was a sufficient amount of touch or hover to trigger the pushing of the virtual button.

Ideally, a particular amount of touch or hover should generate an analog channel output value of the same magnitude regardless of where the touch or hover event occurred on a sensor panel. However, because the electrical characteristics of the sensors in a sensor panel are likely to vary due to processing variations, manufacturing tolerances and assembly differences (which can be due to the location of the sensors in relation to the edges and shape of the sensor panel), the magnitude of the analog channel output values can vary from location to location within the sensor panel. This can lead to inconsistent or false triggering of virtual buttons or non-triggering of virtual buttons, and a difficult user experience as the user discovers that certain areas of the sensor panel require more or less touching, or closer or farther hovering in order to trigger a virtual button.

SUMMARY OF THE INVENTION

Normalization of one or more regions of a sensor panel capable of detecting multi-touch events, or a sensor panel capable of detecting multi-hover events (either type of sensor panel referred to generally herein as a multi-event sensor panel), enables each sensor in the sensor panel to trigger a virtual button in a similar manner, given the same amount of touch or hover. Each sensor in the sensor panel produces an analog channel output value proportional to the level or amount of touch or hover. However, due to processing, manufacturing and physical design differences, the sensor output values can vary from region to region or panel to panel for a given amount of touch or hover. To calibrate or normalize the sensor output values across regions, gain and offset information can be obtained in advance, stored in nonvolatile memory, and later used to normalize the sensor output values so that all regions in the sensor panel can trigger virtual buttons similarly, providing a uniform "response function" at any location on the sensor panel.

It has been empirically determined that a sensor panel that relies on charge coupling (e.g. the capacitive touch sensors or the proximity sensors described above) can be segregated into a number of different regions, each region having sensors that will generate analog channel output values of roughly the same magnitude for a given amount of touch or hover. To determine the gain adjustment for a particular region, the "no touch event" or "no hover event" (i.e. no-event) raw measured output values from the analog channels can be recorded and averaged for all or a selected number of pixels in the region. This can be accomplished by scanning the entire sensor panel without generating any touch or hover events, as described above, at some stage of integration prior to the completion of assembly such as at the factory. Next, uniform "full touch event" or "full hover event" (full-event) raw measured output values can be similarly recorded and averaged for all or a selected number of pixels in the region. The full-event measurements can be accomplished, for example, by touching down a flat object over the entire surface of the sensor panel. Next, the difference (delta) between the averaged full-event and no-event output values can be computed for the region. This difference can then be divided by some representation of the difference between the full-event and the no-event (e.g. the different capacitance values representative of a full-event and a no-event, or some arbitrary scale). The result of the division represents the average slope or gain from no-touch to full-touch (or no-hover and full-hover), referred to herein as a gain multiplication factor, for the region.

To determine the offset adjustment for a particular region, a baseline output value for the entire sensor panel is first selected, which can be an arbitrary value such as zero, or one of the no-event output values (e.g. the lowest obtained no-event output value of any sensor in the entire sensor panel). An offset adjustment value can then be calculated for the region by subtracting the baseline output value from the averaged no-event output value for that region. Both the gain multiplication factors and the offset adjustment values for each region in the sensor panel can then be stored in nonvolatile memory in the computing system.

When a reading from a sensor is taken, a raw output value from an analog channel coupled to the sensor is sent to an error compensation algorithm. When the error compensation algorithm receives the raw output value, it first identifies the region within which the sensor is located. The error compensation algorithm then performs the necessary additions and multiplications in software to perform offset compensation and gain compensation, respectively, on the raw output value, based on the pre-stored gain compensation factors and offset adjustment values for the identified region. The result of the compensation is that the raw output value is converted to a normalized output value. Moreover, for any sensor in the sensor panel and its range of raw output values, the same range of normalized output values will be generated.

The normalized output value can then be sent to a UI algorithm. The UI algorithm can determine whether a received normalized output value has exceeded a fixed threshold that would cause the computing system to interpret the touch or hover as the positive pushing (triggering) of the virtual button underneath the sensor. With each region being offset and gain compensated in this manner, it will essentially take about the same amount of applied touch in each region of the sensor panel to trigger a virtual button.

Alternatively, when a reading from the sensor is taken, the raw output value from the analog channel coupled to the sensor is sent to the error compensation algorithm. When the error compensation algorithm receives a raw output value, it first identifies the region within which sensor is located, as described above. The error compensation algorithm then performs the necessary additions and other computations to perform offset compensation based on the stored offset adjustment value for the identified region. The result of the compensation is that the raw output value is converted to offset compensated output value.

Because there is no gain compensation performed in the error compensation algorithm, gain multiplication factors for each region must be provided to the UI algorithm so that gain compensation can be performed. These gain multiplication factors can be loaded into RAM during boot-up of the panel subsystem, and used by the UI algorithm to generate different threshold values for each region. For example, if a gain multiplication factor for a particular region is visualized as a line having a particular slope, with a y-axis crossing equal to baseline output value, the computed threshold for that region can be a value a certain percentage of the way up the line. In other words, baseline output value can be added to offset compensated output value component of slope representative of the gain multiplication factor. Note that the threshold computations can be performed during boot-up and stored in RAM so that they can be immediately available when offset compensated output value is received by the UI algorithm.

When the offset compensated output value is received by the UI algorithm, by comparing the offset compensated output value against the computed threshold, it can be determined whether the corresponding virtual button has been pushed. The elimination of gain compensation computations in software can result in cost and power savings, and the elimination of processing steps in computing normalized output values for each sensor output value can result in computational efficiencies.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the preferred embodiments of the present invention.

Normalization of one or more regions of a sensor panel capable of detecting multi-touch events, or a sensor panel capable of detecting multi-hover events (either type of sensor panel referred to generally herein as a multi-event sensor panel), enables each sensor in the sensor panel to trigger a virtual button in a similar manner, given the same amount of touch or hover. Each sensor in the sensor panel produces an analog channel output value proportional to the level or amount of touch or hover. However, due to processing, manufacturing and physical design differences, the sensor output values can vary from region to region or panel to panel for a given amount of touch or hover. To calibrate or normalize the sensor output values across regions, gain and offset information can be obtained in advance, stored in nonvolatile memory, and later used to normalize the sensor output values so that all regions in the sensor panel can trigger virtual buttons similarly, providing a uniform "response function" at any location on the sensor panel.

Although some embodiments of the invention may be described herein in terms of the normalization of capacitive multi-touch sensor panels, embodiments of the invention may be generally applicable to other types of multi-touch sensors that can include resistive touch sensors, surface acoustic wave touch sensors, electromagnetic touch sensors, near field imaging touch sensors, and the like. In addition, although the proximity sensors may be described herein as infrared (IR) proximity sensors, embodiments of the invention may be generally applicable to other types of proximity sensors having an output that can be AC-coupled to an analog channel.

Figure 1:
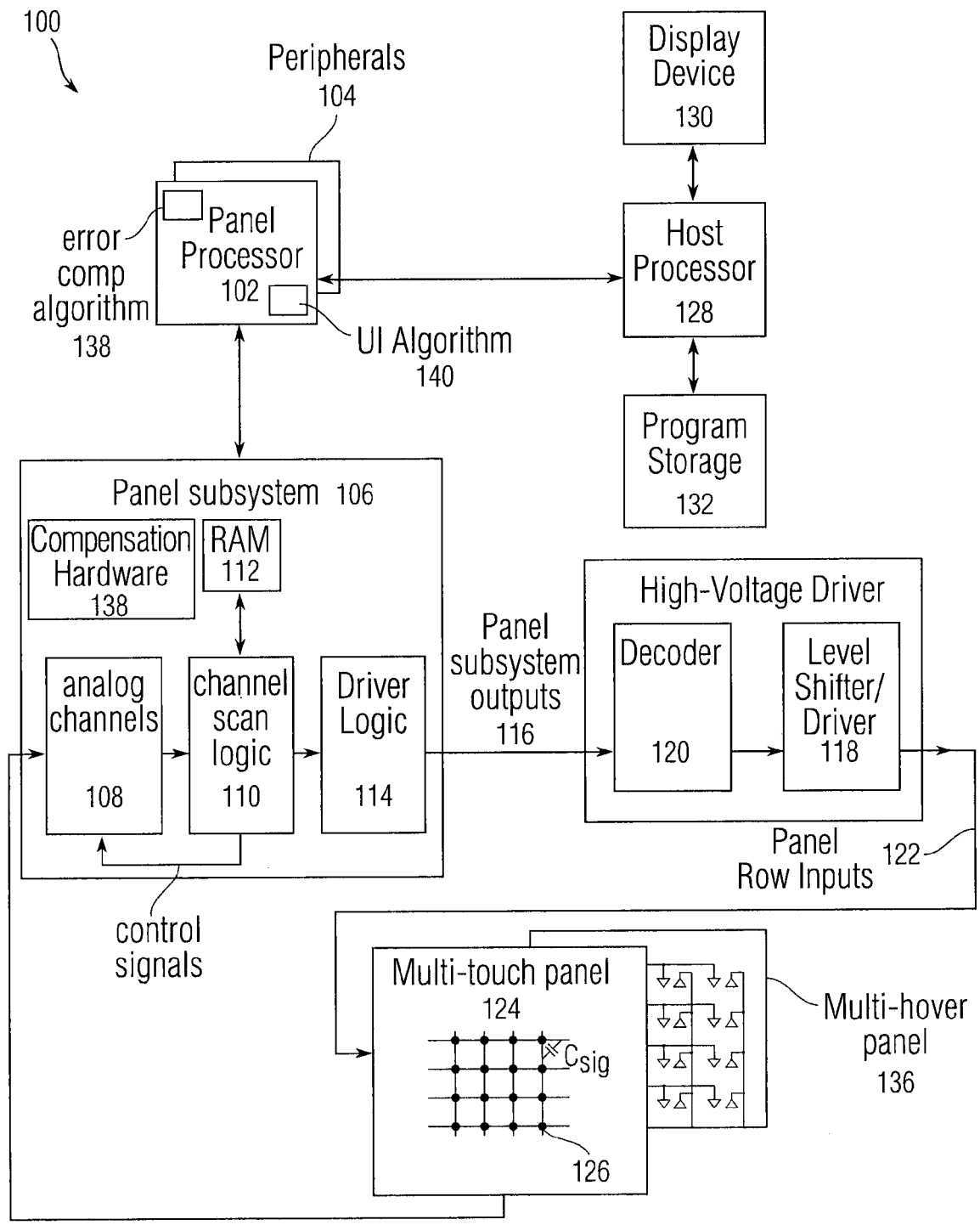
FIG. 1 is an illustration of an exemplary computing system operable with either a multi-touch panel, a multi-hover panel, or a combination of both according to one embodiment of this invention.

Multi-touch touch-sensitive panels may be able to detect multiple touches (touch events or contact points) that occur at about the same time (and at different times), and identify and track their locations. Similarly, multi-hover hover-sensitive panels may be able to detect multiple occurrences of hovering (hover events) that occur at about the same time (and at different times), and identify and track their locations. FIG. 1 illustrates exemplary computing system 100 operable with either multi-touch panel 124, multi-hover panel 136, or a combination of both. Computing system 100 can include one or more panel processors 102 and peripherals 104, and panel subsystem 106. One or more processors 102 can include, for example, an ARM968 processors or other processors with similar functionality and capabilities. However, in other embodiments, the panel processor functionality can be implemented instead by dedicated logic such as a state machine. Peripherals 104 can include, but are not limited to, random access memory (RAM) or other types of memory or storage, watchdog timers and the like.

Panel subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of multi-touch panel 124 or multi-hover panel 136 to analog channels 108. In addition, channel scan logic 110 can control the driver logic and stimulation signals being selectively applied to rows of multi-touch panel 124 or multi-hover panel 136. Error compensation algorithm 138 and UI algorithm 140 (which may be referred to collectively herein as a single normalization algorithm), implemented in software or firmware and executed by panel processor 102, can be used to perform sensor panel normalization according to embodiments of the invention. In some embodiments, panel subsystem 106, panel processor 102 and peripherals 104 can be integrated into a single application specific integrated circuit (ASIC).

Driver logic 114 can provide multiple multi-touch subsystem outputs 116 and can present a proprietary interface that drives high voltage driver, which is comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Decoder 120 can decode the drive interface signals to one out of N outputs, whereas N is the maximum number of rows in the panel. Decoder 120 can be used to reduce the number of drive lines needed between the high voltage driver and multi-touch panel 124. Each panel row input 122 can drive one or more rows in multi-touch panel 124 or multi-hover panel 136. In some embodiments, high voltage driver 118 and decoder 120 can be integrated into a single ASIC. However, in other embodiments high voltage driver 118 and decoder 120 can be integrated into driver logic 114, and in still other embodiments high voltage driver 118 and decoder 120 can be eliminated entirely.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as a liquid crystal display (LCD) for providing a UI to a user of the device.

Multi-touch panel 124 can in some embodiments include a capacitive sensing medium having a plurality of row traces or driving lines and a plurality of column traces or sensing lines. The row and column traces can be formed from a transparent conductive medium such as Indium Tin Oxide (ITO) or Antimony Tin Oxide (ATO), although other non-transparent materials such as copper can also be used. In some embodiments, the row and column traces can be formed on opposite sides of a dielectric material, and can be perpendicular to each other, although in other embodiments other non-orthogonal orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). It should also be noted that in other embodiments, the rows and columns can be formed on a single side of a substrate, or can be formed on two separate substrates separated by a dielectric material. In some embodiments, the dielectric material can be transparent, such as glass, or can be formed from other materials such as mylar. An additional dielectric cover layer may be placed over the row or column traces to strengthen the structure and protect the entire assembly from damage.

At the "intersections" of the traces, where the traces pass above and below each other (but do not make direct electrical contact with each other), the traces essentially form two electrodes. Each intersection of row and column traces can represent a capacitive sensing node and can be viewed as picture element (pixel) 126, which can be particularly useful when multi-touch panel 124 is viewed as capturing an "image" of touch. (In other words, after panel subsystem 106 has determined whether a touch event has been detected at each touch sensor in multi-touch panel 124, the pattern of touch sensors in the multi-touch panel at which a touch event occurred can be viewed as an "image" of touch (e.g. a pattern of fingers touching the panel).) When the two electrodes are at different potentials, each pixel can have an inherent self or mutual capacitance formed between the row and column electrodes of the pixel. If an AC signal is applied to one of the electrodes, such as by exciting the row electrode with an AC voltage at a particular frequency, an electric field and an AC or signal capacitance can be formed between the electrodes, referred to as Csig. The presence of a finger or other object near or on multi-touch panel 124 can be detected by measuring changes to Csig. The columns of multi-touch panel 124 can drive one or more analog channels 108 in panel subsystem 106. In some embodiments, each column is coupled to one dedicated analog channel 108. However, in other embodiments, the columns can be couplable via an analog switch to a fewer number of analog channels 108.

Figure 2A:
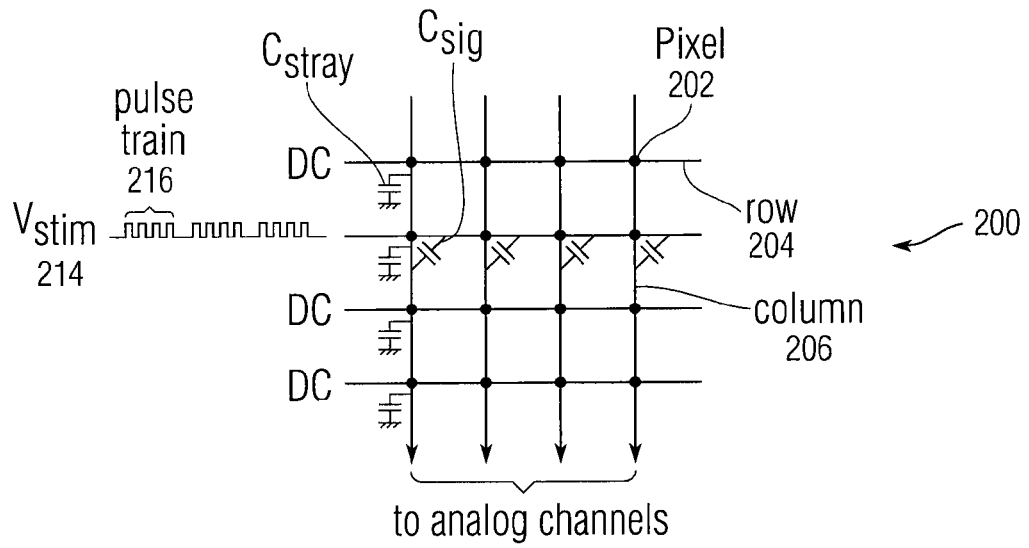
FIG. 2a illustrates an exemplary capacitive multi-touch panel according to one embodiment of this invention.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2a illustrates rows 204 and columns 206 as being substantially perpendicular, they need not be so aligned, as described above. In the example of FIG. 2a, AC stimulus Vstim 214 is being applied to one row, with all other rows connected to DC. The stimulus causes a charge to be injected into the column electrodes through mutual capacitance at the intersecting points. This charge is Qsig=Csig×Vstm. Each of columns 206 can be selectively connectable to one or more analog channels (see analog channels 108 in FIG. 1).

Figure 2B:
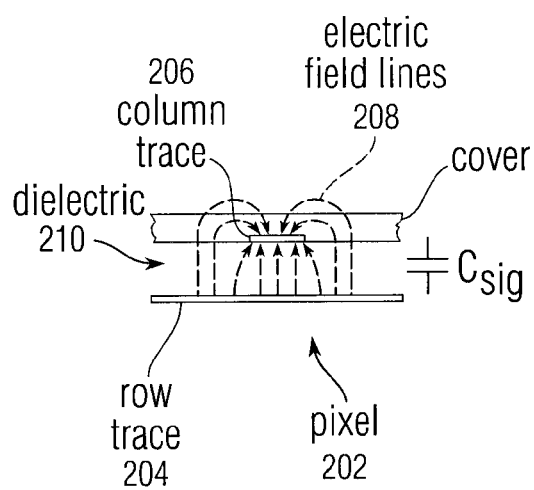
FIG. 2b is a side view of an exemplary pixel in a steady-state (no-touch) condition according to one embodiment of this invention.

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 is shown.

Figure 2C:
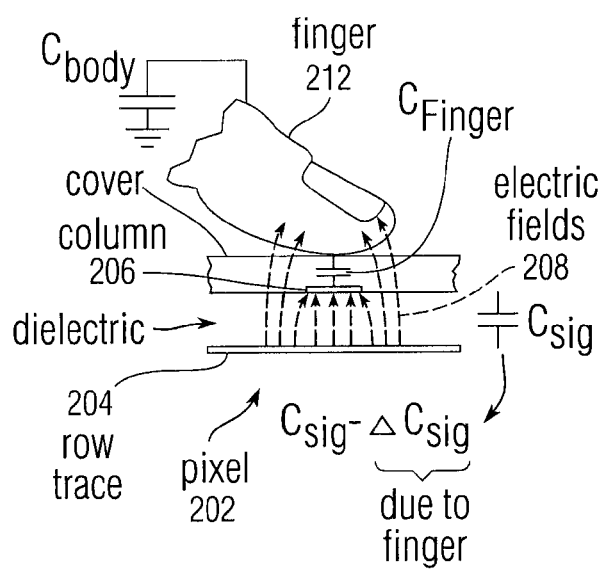
FIG. 2c is a side view of an exemplary pixel in a dynamic (touch) condition according to one embodiment of this invention.

FIG. 2c is a side view of exemplary pixel 202 in a dynamic (touch) condition. In FIG. 2c, finger 212 has been placed near pixel 202. Finger 212 is a low-impedance object at signal frequencies, and has an AC capacitance Cfinger from the column trace 204 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can include one or more pulse trains 216 at a particular frequency, with each pulse train including of a number of pulses. Although pulse trains 216 are shown as square waves, other waveshapes such as sine waves can also be employed. A plurality of pulse trains 216 at different frequencies can be transmitted for noise reduction purposes to detect and avoid noisy frequencies. Vstim signal 214 essentially injects a charge into the row, and can be applied to one row of multi-touch panel 200 at a time while all other rows are held at a DC level. However, in other embodiments, the multi-touch panel may be divided into two or more sections, with Vstim signal 214 being simultaneously applied to one row in each section and all other rows in that region section held at a DC voltage.

Each analog channel coupled to a column measures the mutual capacitance formed between that column and the row. This mutual capacitance is comprised of the signal capacitance Csig and any change Csig_sense in that signal capacitance due to the presence of a finger, palm or other body part or object. These column values provided by the analog channels may be provided in parallel while a single row is being stimulated, or may be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

Figure 3:
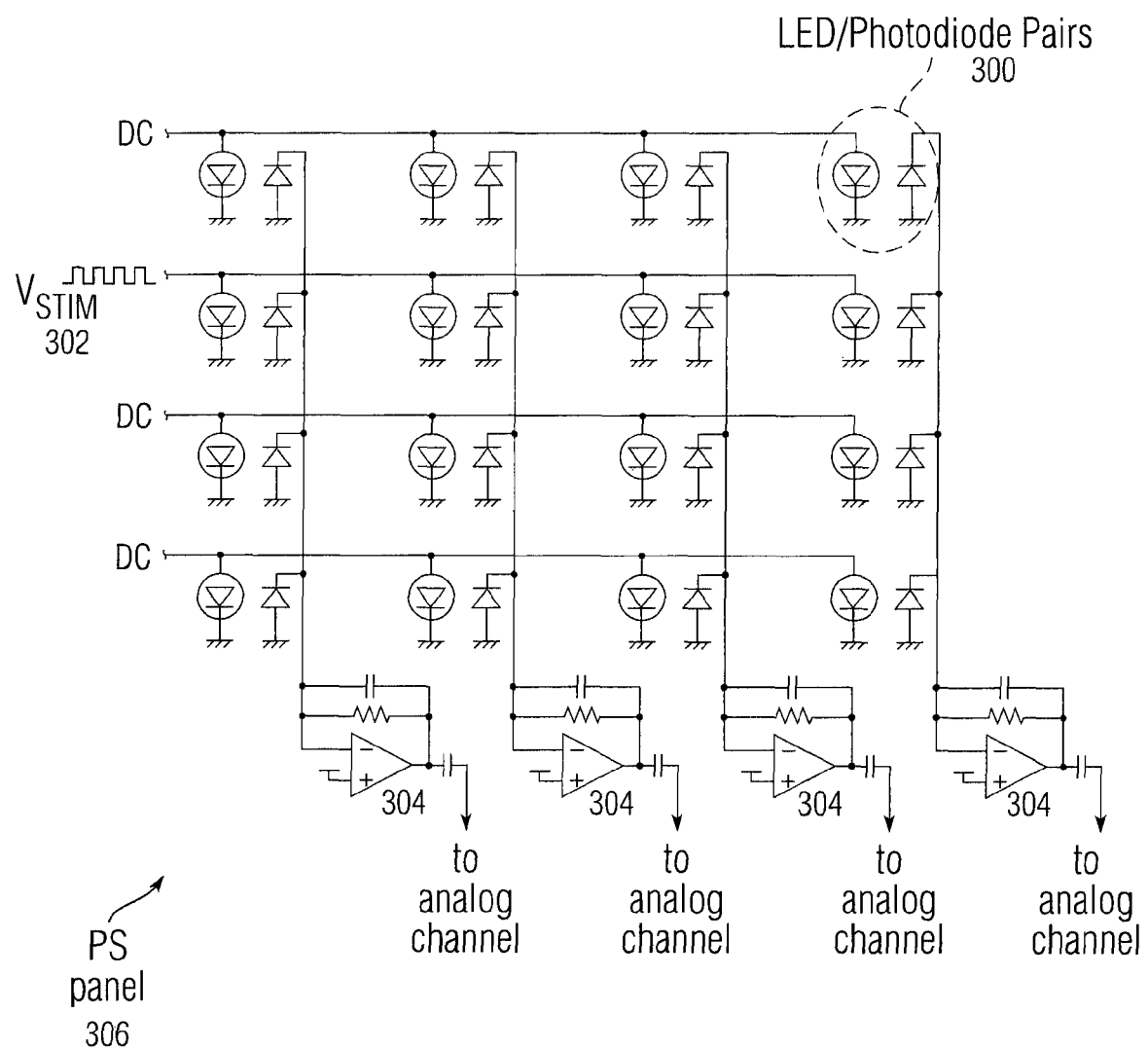
FIG. 3 illustrates an exemplary proximity sensor panel that can include an array of LED/photodiode pairs, each pair representing a portion of a proximity sensor, according to one embodiment of this invention.

FIG. 3 illustrates exemplary proximity sensor panel 306 that can include an array of LED/photodiode pairs 300, each pair representing a portion of a proximity sensor, according to some embodiments of the invention. In FIG. 3, each LED/photodiode pair 300 in a particular row can be simultaneously stimulated by Vstim 302 with the other rows held at a DC voltage, and after a snapshot of the row has been captured, LED/photodiode pairs 300 in a new row can be stimulated. In the example of FIG. 3, each LED/photodiode pair 300 in a particular column can be simultaneously connected to a single photodiode amplifier 304, and each photodiode amplifier 304 can be connected to a separate analog channel of the same design that can be used to detect changes in signal capacitance in a capacitive touch sensor array. In this manner, for every row being stimulated, the analog channels for each column can determine, at about the same time, whether the LED/photodiode pair in the row being stimulated has detected the presence of a finger, palm or other object. Eventually, if Vstim has been applied to all rows, and the effect of any photodiode current on all columns in all rows has been captured (i.e. the entire proximity sensor panel 306 has been "scanned"), a "snapshot" of all pixel values can be obtained for the entire panel. This snapshot data can be initially saved in the panel subsystem, and later transferred out for interpretation by other devices in the computing system such as the host processor. As multiple snapshots are obtained, saved and interpreted by the computing system, it is possible for multiple hover events to be detected, tracked, and used to perform other functions.

Figure 4:
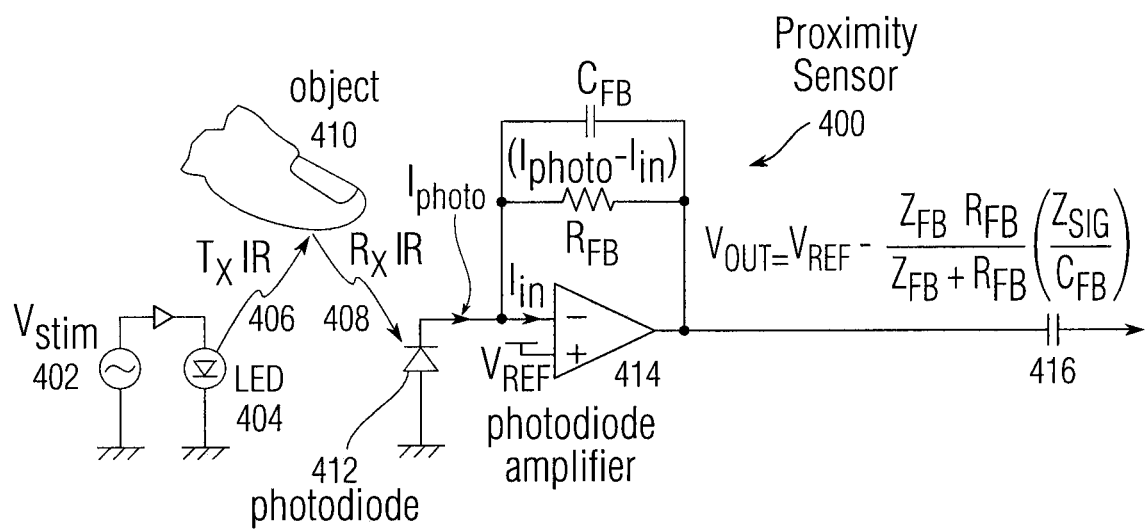
FIG. 4 is an illustration of an exemplary proximity sensor according to one embodiment of this invention.

FIG. 4 is an illustration of exemplary proximity sensor 400 according to some embodiments of this invention. Proximity sensors 400 can detect one or more fingers, a palm or other object touching the multi-touch panel or hovering over the multi-touch panel in the far field without touching it. Proximity sensor 400 can include source Vstim 402 that drives IR light emitting diode (LED) 404, which emits transmitted IR 406. Vstim 402 can include a burst of square waves in an otherwise DC signal, in a manner similar to the Vstim applied to the rows on the capacitive multi-touch panel as described above, although in some embodiments the square waves representing Vstim can be preceded and followed by other non-DC signaling. Reflected IR 408, which may have reflected off of a finger, palm or other object 410, can be detected by photodiode (e.g. a fast pin diode) 412 or any other device (e.g. a phototransistor or other sensing device) whose current changes as a function of received IR light. Photodiode 412 can be reversed biased to a reference voltage Vref, which can be maintained at the − input (inverting input) of photodiode amplifier 414 whose + input (non-inverting input) is tied to Vref. The photocurrent produced through the photodiode, Iphoto, also primarily passes through the parallel combination of feedback resistor Rfb and capacitor Cfb, and the output of the photodiode amplifier is Vref−(Zcfb×Rfb)×(Iphoto+Iin)/(Zcfb+Rfb), the latter term (Zcfb×Rfb)×(Iphoto+Iin)/(Zcfb+Rfb), representing the voltage drop across Rfb and Cfb where Iin is the input current to the inverting input of photodiode amplifier 414 and is usually negligible. The impedance Zcfb is frequency dependent and can be adjusted to optimize the gain of the photo amplifier for a given modulation frequency of the signal Iphoto, whereas Iphoto(t)=Ip×sin(wt) with wt=2×PI×fmod and fmod is the modulation signal, Ip is the amplitude of the modulation signal and Zcfb=−1/(jwt). The modulation frequency fmod is equivalent to the modulation frequency fstm of Vstm. The output of photodiode amplifier 414 can be AC coupled using AC coupling capacitor 416.

Figure 5:
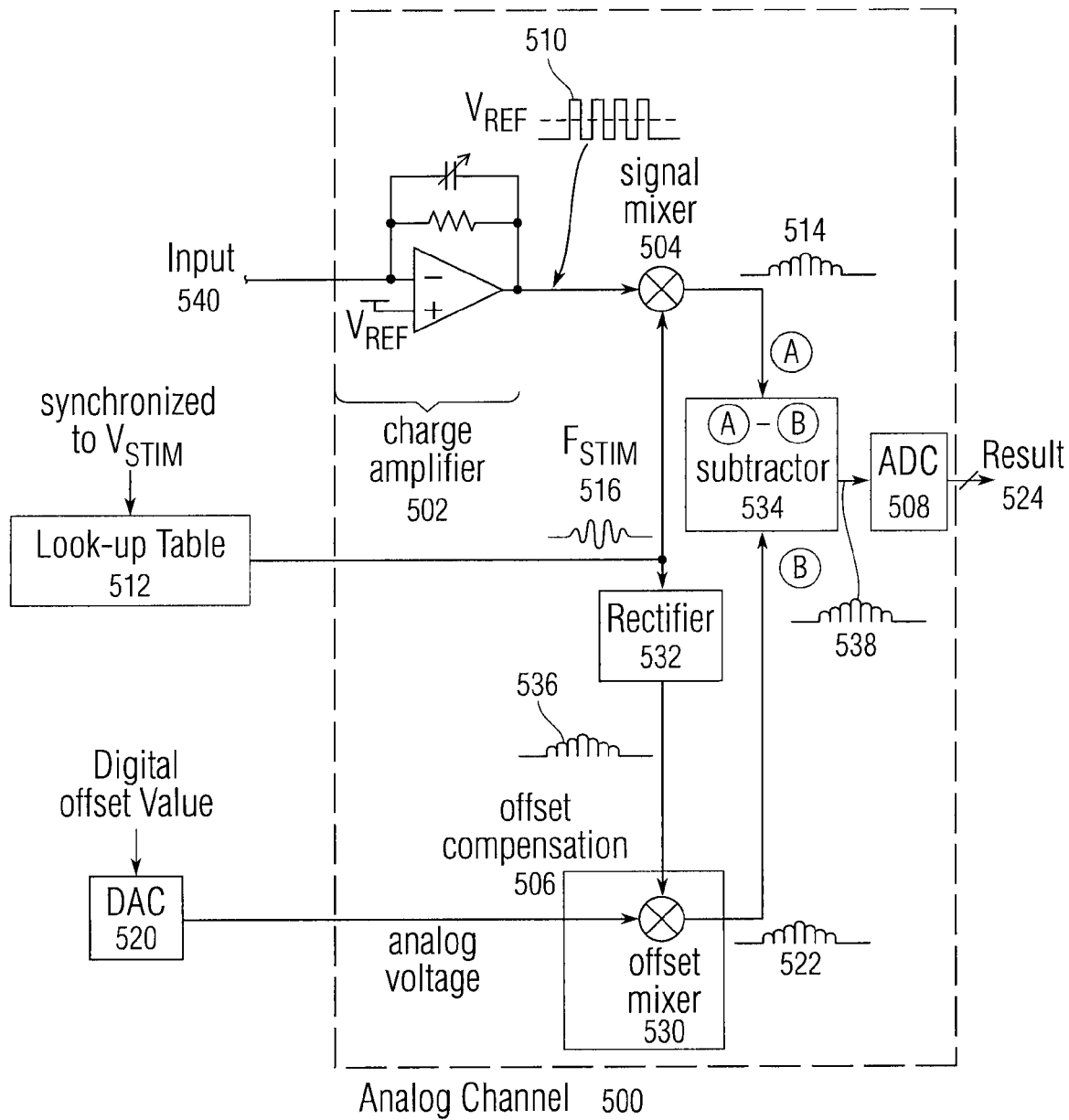
FIG. 5 illustrates exemplary analog channel (event detection and demodulation circuit) according to one embodiment of this invention.

FIG. 5 illustrates exemplary analog channel (event detection and demodulation circuit) 500. One or more analog channels 500 can be present in the panel subsystem. One or more columns from a multi-touch panel or a multi-hover panel can be connectable to input 540 of each analog channel 500. Each analog channel 500 can include virtual-ground charge amplifier 502, signal mixer 504, offset compensation 506, rectifier 532, subtractor 534, and analog-to-digital converter (ADC) 508.

Vstim, as applied to a row in the multi-touch panel or multi-hover panel, can be generated as a burst of square waves or other non-DC signaling in an otherwise DC signal, although in some embodiments the square waves representing Vstim can be preceded and followed by other non-DC signaling. If Vstim is applied to a row of a multi-touch panel or multi-hover panel, and a column of the multi-touch panel or multi-hover panel is connected to analog channel 500, the output of charge amplifier 502 can be pulse train 510 centered at Vref with a peak-to-peak (p-p) amplitude in the steady-state condition that is a fraction of the p-p amplitude of Vstim, the fraction corresponding to the gain of charge amplifier 502. For example, if Vstim is generated as 18V p-p pulses and the net gain of Csig in series with the charge amplifier is 0.1, then the output of the charge amplifier can be 1.8V p-p pulses. This output can be mixed in signal mixer 504 with a demodulation waveform Fstim 516.

Because Vstim can create undesirable harmonics, especially if generated as square waves, demodulation waveform Fstim 516 can be a Gaussian sine wave in an otherwise DC signal that is digitally generated from look-up table (LUT) 512 or other digital logic and synchronized to Vstim. In some embodiments, Fstim 516 can be tunable in frequency and amplitude by selecting different digital waveforms in LUT 512 or generating the waveforms differently using other digital logic. Signal mixer 504 can demodulate the output of charge amplifier 510 by subtracting Fstim 516 from the output to provide better noise rejection. Signal mixer 504 can reject all frequencies outside the passband, which can in one example be about +/−30 kHz around Fstim. This noise rejection can be beneficial in noisy environment with many sources of noise, such as 802.11, Bluetooth and the like, all having some characteristic frequency that can interfere with the sensitive (femtofarad level) analog channel 500. Signal mixer 504 can also be implemented as a synchronous rectifier, and as a result, signal mixer output 514 can be a rectified Gaussian sine wave.

Offset compensation 506 can then be applied to signal mixer output 514, which can remove the effect of the static (no-touch or no-hover) signal appearing at input 540, leaving only the effect of the touch or hover appearing as result 524. Offset compensation 506 can be implemented using offset mixer 530. Offset compensation output 522 can be generated by rectifying Fstim 516 using rectifier 532, and mixing the rectifier output 536 with an analog voltage from digital-to-analog converter (DAC) 520 in offset mixer 530. DAC 520 can generate the analog voltage based on a digital value selected to increase the dynamic range of analog channel 500. Offset compensation output 522, which can be proportional to the analog voltage from the DAC 520, can then be subtracted from signal mixer output 514 using subtractor 534, producing subtractor output 538 which can be representative of the change in the signal appearing at input 540 that occurs when a touch or hover event has occurred. Subtractor output 538 can then be converted to a digital value by ADC 508. In some embodiments, ADC 508 can be a sigma-delta ADC, which can sum a number of consecutive digital values and average them to generate result 524.

As mentioned above, the electrical characteristics of the sensors (pixels) in a sensor panel are likely to vary due to processing variations, manufacturing tolerances and assembly differences (which can be due to the location of the sensors in relation to the edges and shape of the sensor panel). For example, variations in the etching pattern for the ITO, variations in the dielectric constant of the glass substrate, the presence of microbubbles in the laminated stackup of materials that form the sensor panel, routing differences in traces on the panel and flex circuits connecting to the panel, or differences in the dielectric constant of the cover layer, can affect the magnitude of the analog channel output values from location to location within the sensor panel, and from panel to panel.

It has been empirically determined that a sensor panel that relies on charge coupling (e.g. the capacitive touch sensors or the proximity sensors described above) can be segregated into a number of different regions, each region having sensors that will generate analog channel output values of roughly the same magnitude for a given amount of touch or hover. The different analog channel output values in the different regions can be due in part to the fact that charge-coupling sensors are influenced by edge effects. For example, a capacitive touch sensor is essentially a stack formed from an electrode, a dielectric material such as glass or plastic, and another electrode. At the edge of the sensor panel the dielectric stops, and therefore the fringing fields are different at the edge as compared to the center.

Figure 6:
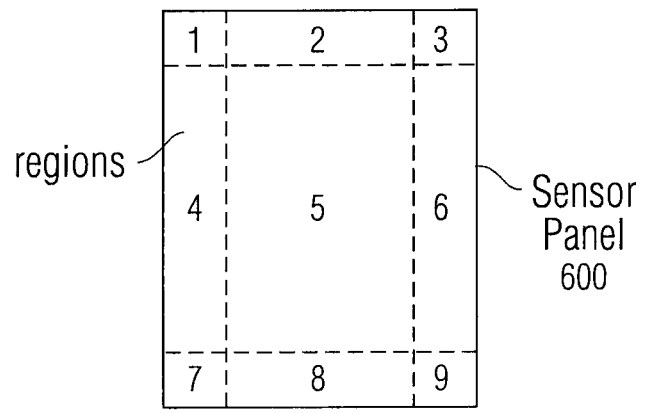
FIG. 6 illustrates an exemplary sensor panel divided into nine regions according to one embodiments of this invention.

FIG. 6 illustrates an exemplary sensor panel divided into nine regions according to some embodiments of the invention, although it should be noted that fewer or more regions (or even a single region) can also be defined due to the use of different types of sensor panels or regional defects/differences particular to a particular panel such as bubbles, etch defects, and trace length differences. The number and location of the regions can be empirically determined in advance, as mentioned above, by recording non-event and/or full-event raw output values for all sensors in the panel, and then determining which pixels should be grouped together in a single region based on the similarity of their output values.

To determine the gain adjustment for a particular region, the "no touch event" or "no hover event" (i.e. no-event) raw measured output values from the analog channels can be recorded and averaged for all or a selected number of pixels in the region. This can be accomplished by scanning the entire sensor panel without generating any touch or hover events, as described above, at some stage of integration prior to the completion of assembly such as at the factory. Next, uniform "full touch event" or "full hover event" (full-event) raw measured output values can be similarly recorded and averaged for all or a selected number of pixels in the region. The full-event measurements can be accomplished, for example, by touching down a flat object over the entire surface of the sensor panel. Next, the difference (delta) between the averaged full-event and no-event output values can be computed for the region. This difference can then be divided by some representation of the difference between the full-event and the no-event (e.g. the different capacitance values representative of a full-event and a no-event, or some arbitrary scale). The result of the division represents the average slope or gain from no-touch to full-touch (or no-hover and full-hover), referred to herein as a gain multiplication factor, for the region. However, if the difference is too great, the entire sensor panel can be discarded as part of quality control.

To determine the offset adjustment for a particular region, a baseline output value for the entire sensor panel is first selected, which can be an arbitrary value such as zero, or one of the no-event output values (e.g. the lowest obtained no-event output value of any sensor in the entire sensor panel). An offset adjustment value can then be calculated for the region by subtracting the baseline output value from the averaged no-event output value for that region. Both the gain multiplication factors and the offset adjustment values for each region in the sensor panel can then be stored in nonvolatile memory in the computing system.

Figure 7:
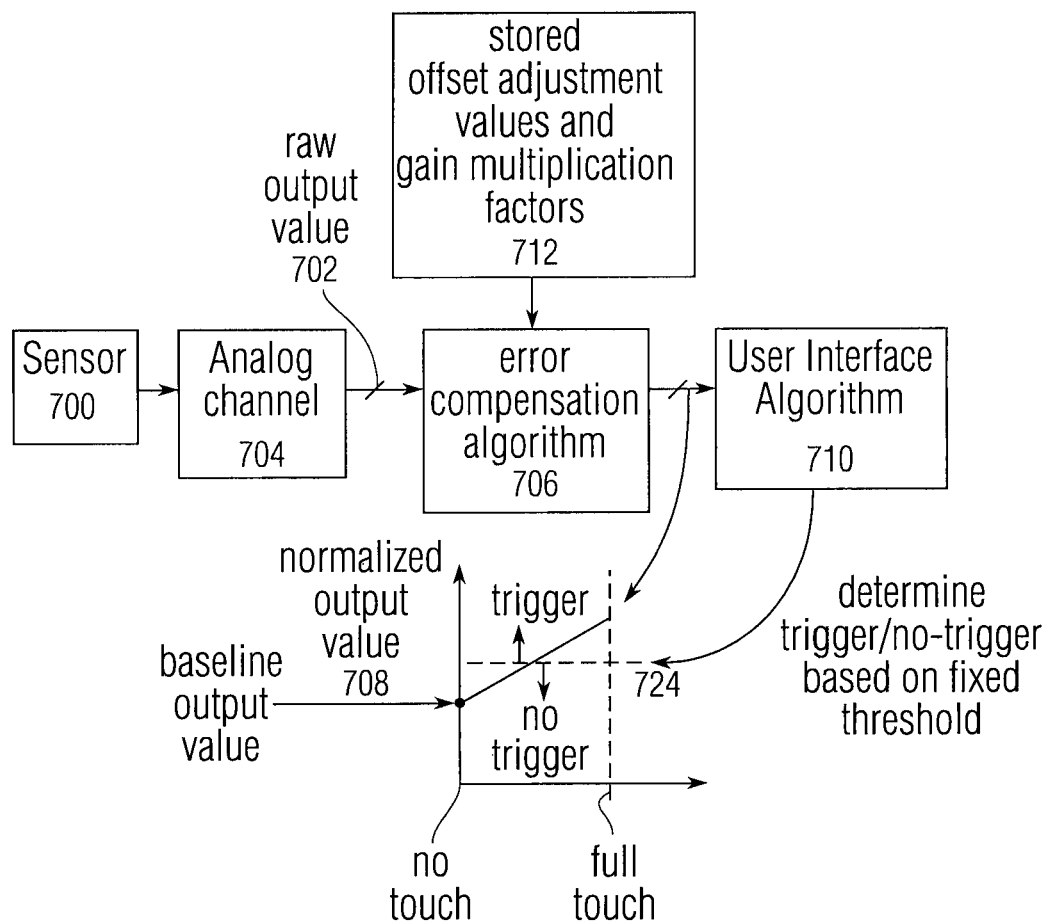
FIG. 7 illustrates an exemplary process for detecting the pressing of a virtual button on a sensor panel according to one embodiment of this invention.

FIG. 7 illustrates an exemplary process for detecting the pressing of a virtual button on a sensor panel according to some embodiments of the invention. In FIG. 7, the previously obtained gain multiplication factors and offset adjustment values for each region, as described above, have been pre-stored in block 712, which can in some embodiments be an EEPROM. Sensor 700 can be located above the virtual button that can be displayed on a display screen beneath a sensor panel. When a reading from sensor 700 is taken, raw output value 702 from analog channel 704 coupled to sensor 700 is sent to error compensation algorithm 706. When error compensation algorithm 706 receives raw output value 702, it first identifies the region within which sensor 700 is located. This region identification can be performed by correlating the row and column of sensor 700 to a known region. The row is known because the channel scan logic is driving a particular row in the sensor panel, and the column is known because analog channel 704 is connected to a particular column of the sensor panel. Error compensation algorithm 706 then performs the necessary additions and multiplications in software to perform offset compensation and gain compensation, respectively, on the raw output value 702, based on the pre-stored gain compensation factors and offset adjustment values 712 for the identified region. The result of the compensation is that raw output value 702 is converted to a normalized output value 708. Moreover, for any sensor 700 in the sensor panel and its range of raw output values 702, the same range of normalized output values (see FIG. 7) will be generated.

Normalized output value 708 can then be sent to UI algorithm 710. UI algorithm 710 can determine whether a received normalized output value 708 has exceeded a fixed threshold 724 that would cause the computing system to interpret the touch or hover as the positive pushing (triggering) of the virtual button underneath sensor 700. With each region being offset and gain compensated in this manner, it will essentially take about the same amount of applied touch in each region of the sensor panel to trigger a virtual button.

Figure 8:
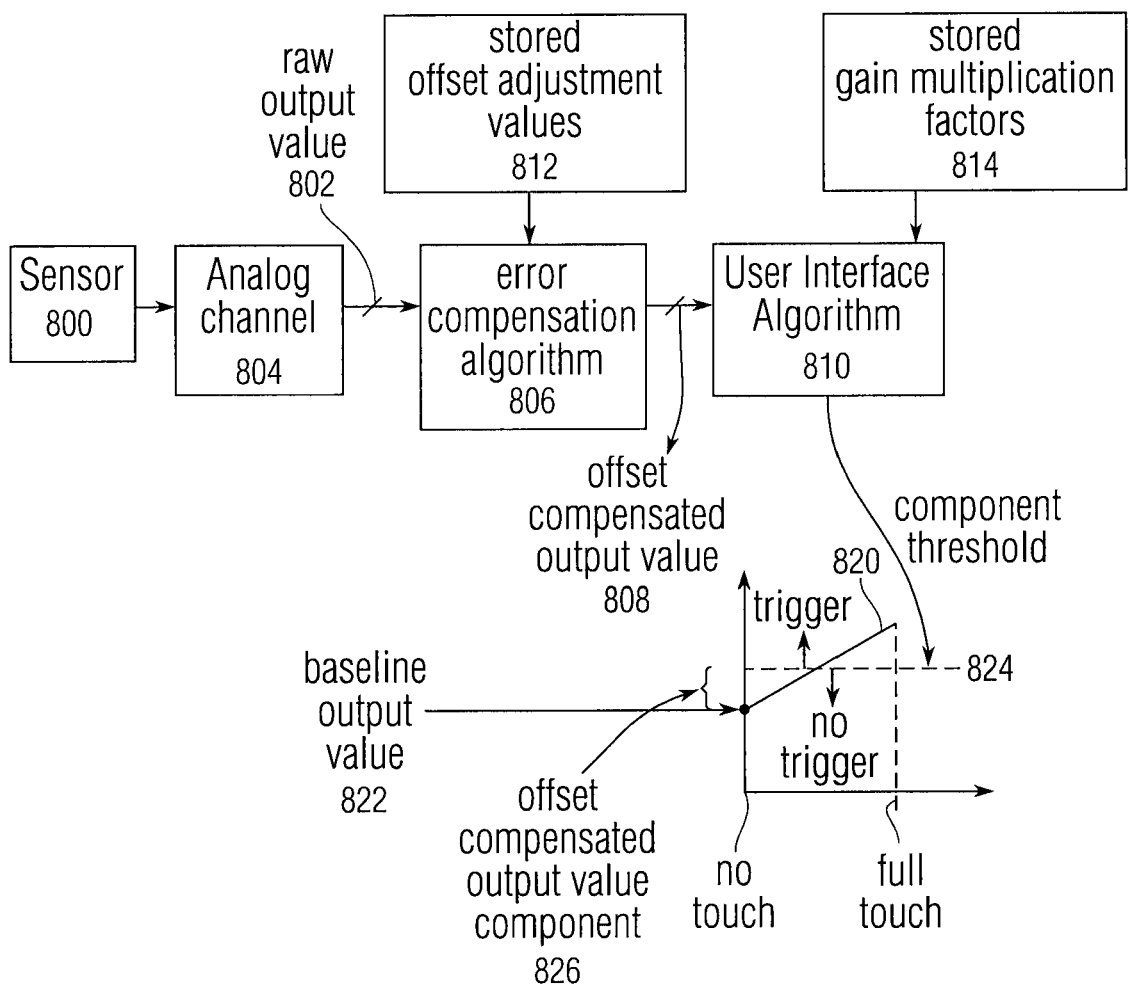
FIG. 8 illustrates an exemplary process for detecting the pressing of a virtual button on a sensor panel according to one embodiment of this invention.

FIG. 8 illustrates an exemplary process for detecting the pressing of a virtual button on a sensor panel according to other embodiments of the invention. In FIG. 8, the previously obtained gain multiplication factors and offset adjustment values for each region, as described above, have been pre-stored in blocks 812 and 814, which can in some embodiments be an EEPROM. Sensor 800 can be located above the virtual button being displayed on a display screen beneath a sensor panel. When a reading from sensor 800 is taken, raw output value 802 from analog channel 804 coupled to sensor 800 is sent to error compensation algorithm 806. When error compensation algorithm 806 receives raw output value 802, it first identifies the region within which sensor 800 is located, as described above. Error compensation algorithm 806 then performs the necessary additions and other computations to perform offset compensation based on the stored offset adjustment value 812 for the identified region. The result of the compensation is that raw output value 802 is converted to offset compensated output value 808.

Because there is no gain compensation performed in error compensation algorithm 806, gain multiplication factors 814 for each region must be provided to UI algorithm 810 so that gain compensation can be performed. These gain multiplication factors 814 can be loaded into RAM during boot-up of the panel subsystem, and used by UI algorithm 810 to generate different threshold values for each region. For example, if a gain multiplication factor for a particular region is visualized as line 820 having a particular slope, with a y-axis crossing equal to baseline output value 822, the computed threshold 824 for that region can be a value a certain percentage of the way up the line 820. In other words, baseline output value 822 can be added to offset compensated output value component 826 of slope 820 representative of the gain multiplication factor. Note that the threshold computations can be performed during boot-up and stored in RAM so that they can be immediately available when offset compensated output value 808 is received by UI algorithm 810.

When offset compensated output value 808 is received by UI algorithm 810, by comparing offset compensated output value 808 against computed threshold 824, it can be determined whether the corresponding virtual button has been pushed. The elimination of gain compensation computations in software can result in cost and power savings, and the elimination of processing steps in computing normalized output values for each sensor output value can result in computational efficiencies.

Figure 9A:
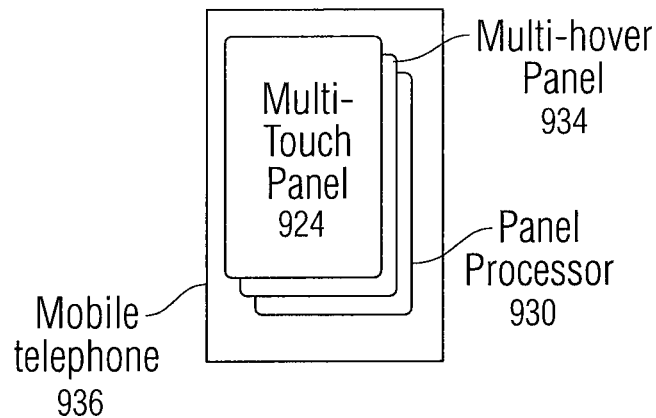
FIG. 9a illustrates an exemplary mobile telephone that can include a multi-touch panel and/or a multi-hover panel, and a panel processor configured for implementing sensor panel normalization according to one embodiment of this invention.
Figure 9B:
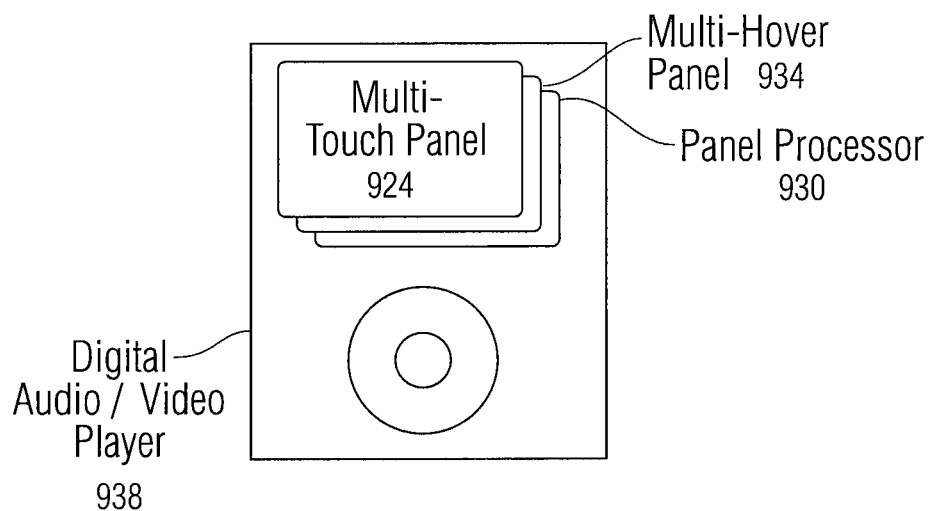
FIG. 9b illustrates exemplary digital audio/video player that can include a multi-touch panel and/or a multi-hover panel and a panel processor configured for implementing sensor panel normalization according to one embodiment of this invention.

FIG. 9a illustrates exemplary mobile telephone 936 that can include multi-touch panel 924 and/or multi-hover panel 934, and panel processor 930 configured for implementing sensor panel normalization as described above according to embodiments of the invention. FIG. 9b illustrates exemplary digital audio/video player 938 that can include multi-touch panel 924 and/or multi-hover panel 934 and panel processor 930 configured for implementing sensor panel normalization as described above according to embodiments of the invention. The mobile telephone and digital audio/video player of FIGS. 9a and 9b can advantageously benefit from sensor panel normalization because without it, the sensors within various regions within the panel can generate different output values, which can cause inconsistent or false triggering of virtual buttons or non-triggering of virtual buttons, and a difficult user experience as the user discovers that certain areas of the sensor panel require more or less touching, or closer or farther hovering in order to trigger a virtual button.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for normalizing sensor output values in a sensor panel, comprising:
    performing a scan of the sensor panel to generate a plurality of sensor output values;
    determining one or more spatial regions of the sensor panel associated with each of the plurality of sensor output values, each region associated with a plurality of sensors, an offset adjustment value, and a gain multiplication factor;
    obtaining the offset adjustment value for each region by
        recording and averaging no-event output values for one or more sensors in that region,
        selecting a baseline output value applicable to all regions, and
        computing a difference between the averaged no-event output value for the region and the baseline output value; and
    applying the offset adjustment value and the gain multiplication factor to each previously generated sensor output value located in a region to generate normalized sensor output values for the region.

2. The method of claim 1, further comprising determining whether a virtual input has been triggered by comparing a function of one or more normalized sensor output values with a threshold.

3. The method of claim 1, further comprising:
    obtaining the gain multiplication factor for each region by
        recording and averaging no-event and full-event output values for one or more sensors in that region,
        computing a first range as a difference between the averaged full-event and no-event output values,
        determining a second range as number representative of a difference between the full-event and the no-event, and
        dividing the first range by the second range.

4. The method of claim 1, the applying of the offset adjustment value and the gain multiplication factor to each sensor output value to generate normalized output values comprising:
    performing mathematical operations in accordance with an error compensation algorithm using the offset adjustment value and the gain multiplication factor for the region within which each sensor is located.

5. The method of claim 1, the sensor panel comprising a touch sensor panel.

6. The method of claim 1, the sensor panel comprising a hover sensor panel.

7. An apparatus for normalizing sensor output values in a sensor panel, comprising:
    a panel processor programmed for performing a scan of the sensor panel to generate a plurality of sensor output values;

determining one or more spatial regions of the sensor panel associated with each of the plurality of sensor output values, each region associated with a plurality of sensors, an offset adjustment value, and a gain multiplication factor;

obtaining the offset adjustment value for each region by
recording and averaging no-event output values for one or more sensors in that region,
selecting a baseline output value applicable to all regions, and
computing a difference between the averaged no-event output value for the region and the baseline output value; and applying the offset adjustment value and the gain multiplication factor to each previously generated sensor output value located in a region to generate normalized sensor output values for the region.

8. The apparatus of claim 7, the processor further programmed for determining whether a virtual input has been triggered by comparing a function of one or more normalized sensor output values with a threshold.

9. The apparatus of claim 7, further comprising one or more event detection and demodulation circuits coupled to the panel processor for generating the output values.

10. The apparatus of claim 9, further comprising a computing system that incorporates the apparatus, the computing system comprising:
the sensor panel, the sensor panel coupled to the panel processor and the one or more event detection and demodulation circuits;
a panel subsystem coupled to the panel processor and including the one or more event detection and demodulation circuits; and
a host processor coupled to the panel processor.

11. The apparatus of claim 10, further comprising a mobile telephone that incorporates the computing system.

12. The apparatus of claim 10, further comprising a digital audio player that incorporates the computing system.

13. The apparatus of claim 7, the panel processor further programmed for applying the offset adjustment value and gain multiplication factor to each sensor output value to generate normalized output values by performing mathematical operations in accordance with an error compensation algorithm using the offset adjustment value and the gain multiplication factor for the region within which each sensor is located.

14. The apparatus of claim 7, the sensor panel comprising a touch sensor panel.

15. The apparatus of claim 7, the sensor panel comprising a hover sensor panel.

16. An apparatus for normalizing sensor output values in a sensor panel, comprising:

means for performing a scan of the sensor panel to generate a plurality of sensor output values;

means for determining one or more spatial regions of the sensor panel associated with each of the plurality of sensor output values, each region associated with a plurality of sensors, an offset value, and a gain multiplication factor;

means for obtaining the offset adjustment value for each region by
recording and averaging no-event output values for one or more sensors in that region,
selecting a baseline output value applicable to all regions, and
computing a difference between the averaged no-event output value for the region and the baseline output value; and means for applying the offset adjustment value and the gain multiplication factor to each previously generated sensor output value located in the region to generate normalized output values for the region.

17. The apparatus of claim 16, further comprising means for determining whether a virtual input has been triggered by comparing a function of one or more normalized sensor output values with a threshold.

18. A non-transitory computer-readable storage medium comprising program code for normalizing sensor output values in a sensor panel, the program code for causing performance of a method comprising:

performing a scan of the sensor panel to generate a plurality of sensor output values;

determining one or more spatial regions of the sensor panel associated with each of the plurality of sensor output values, each region associated with a plurality of sensors, an offset adjustment value, and a gain multiplication factor;

obtaining the offset adjustment value for each region by
recording and averaging no-event output values for one or more sensors in that region,
selecting a baseline output value applicable to all regions, and
computing a difference between the averaged no-event output value for the region and the baseline output value; and applying the offset adjustment value and the gain multiplication factor to each previously generated sensor output value located in the region to generate normalized sensor output values for the region.

19. The non-transitory computer-readable storage medium of claim 18, the method further comprising determining whether a virtual input has been triggered by comparing a function of one or more normalized sensor output values with a threshold.

* * * * *